Nov. 1, 1938.          H. RICHARDSON                2,135,241
                      HARROW OR DRAG LIFT
                    Filed Oct. 27, 1937         2 Sheets-Sheet 1

Hugh Richardson,
INVENTOR.

BY C. A. Snow & Co.
ATTORNEYS.

Nov. 1, 1938. H. RICHARDSON 2,135,241
HARROW OR DRAG LIFT
Filed Oct. 27, 1937 2 Sheets-Sheet 2
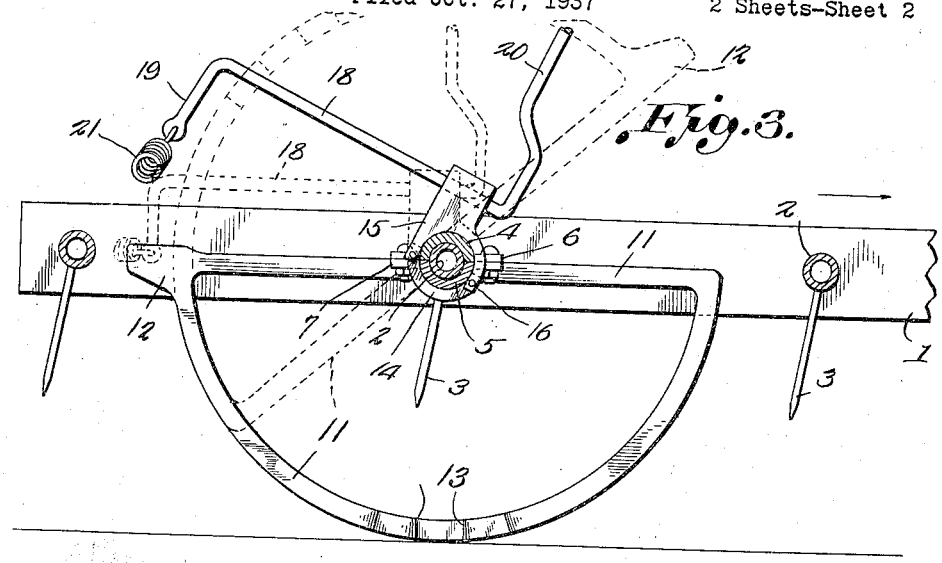
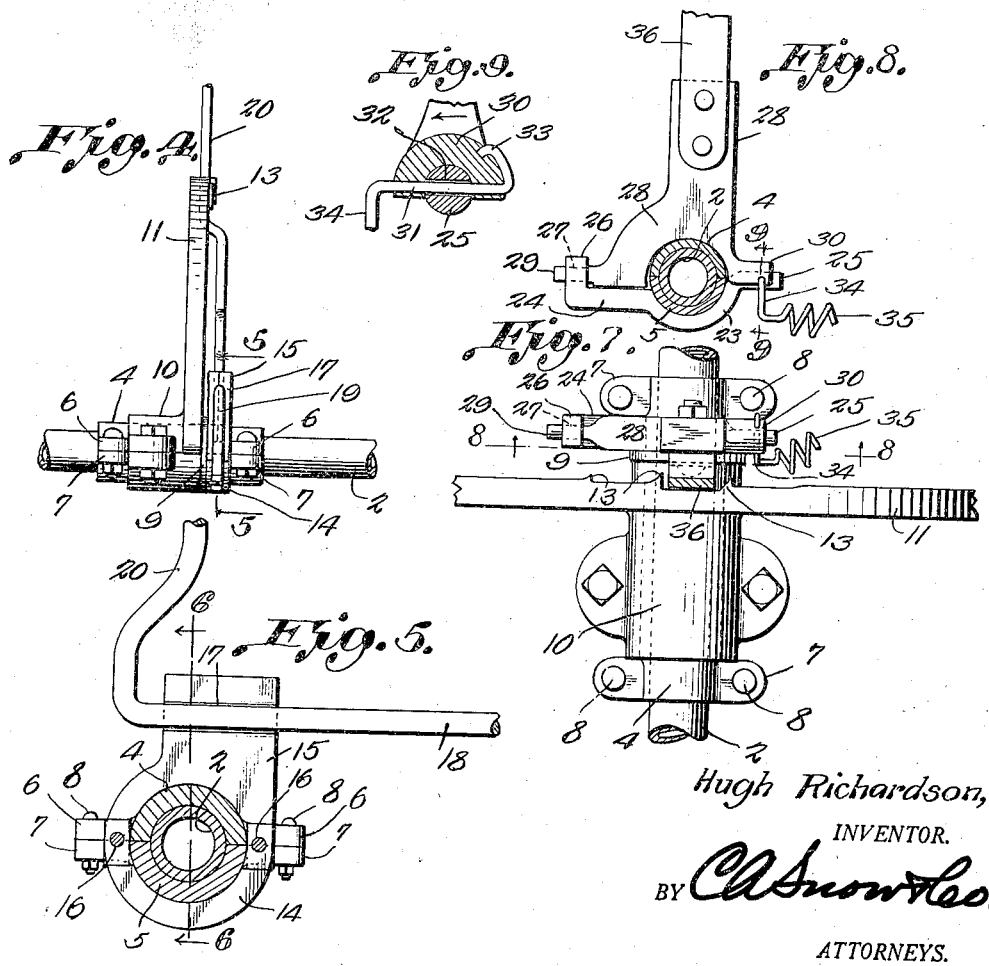
Hugh Richardson, INVENTOR.
BY C. A. Snow & Co.
ATTORNEYS.

Patented Nov. 1, 1938

2,135,241

UNITED STATES PATENT OFFICE 2,135,241

HARROW OR DRAG LIFT

Hugh Richardson, Nelson, Mo.

Application October 27, 1937, Serial No. 171,302

4 Claims. (Cl. 55—34)

This invention relates to harrow or drag lifts, one of the objects being to provide simple and efficient means whereby the harrow can be lifted bodily while moving forwardly, thereby to raise the teeth from the soil and provide sufficient clearance to allow accumulated weeds, stalks and other materials, to slide downwardly from the teeth or become stripped therefrom after which the teeth will return to the soil and the operation of the harrow continued.

A further object is to provide means under the control of the operator for bringing the lifting mechanism into action whenever it is desired to clear the teeth of the harrow.

A still further object is to provide lifting means of this type which can be combined readily with various types of drag harrows.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings—

Figure 3 is an enlarged section on line 3—3, Figure 1, the lifting segment being in a position opposite to that shown in Figure 1.

Figure 4 is an enlarged rear elevation of the lifting mechanism, the segment being shown in its raised or normal position as in Figure 1.

Figure 5 is an enlarged section on line 5—5, Figure 4.

Figure 7 is a view partly in section and partly in plan showing a portion of a modified form of lifting mechanism.

Figure 8 is a section on line 8—8, Figure 7.

Figure 9 is an enlarged section on line 9—9, Figure 8.

Figure 1:
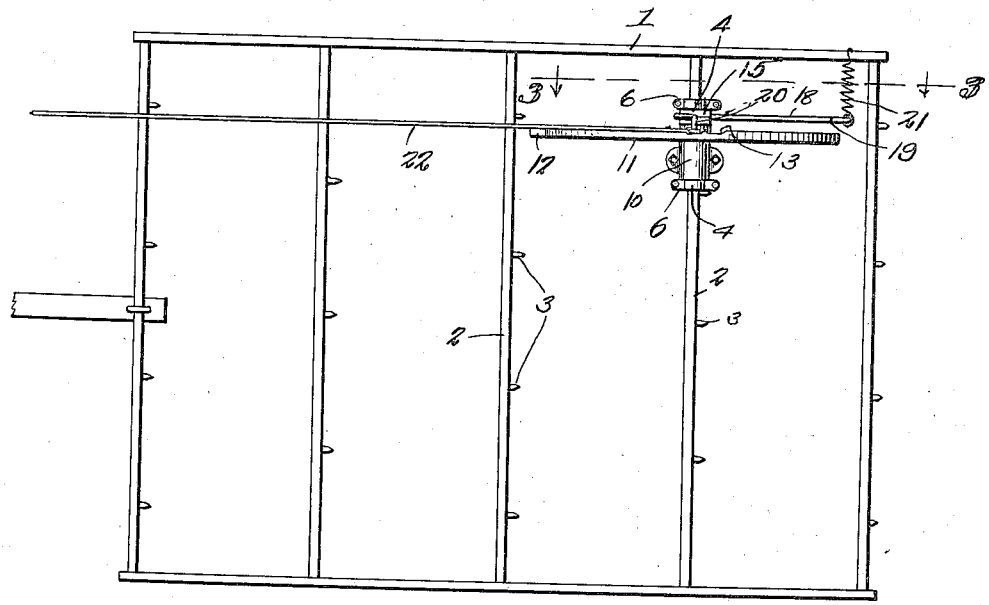
Figure 1 is a plan view of a harrow or drag equipped with the present improvements.

Referring to the figures by characters of reference I designates a drag harrow of any desired construction having cross bars 2 from which extend teeth 3. This harrow is adapted to be drawn by any suitable means and, as is well known to those skilled in the art, a considerable amount of trash in the form of weeds, stalks, etc., will ultimately accumulate on the teeth. Heretofore it has been a difficult matter to remove these in order that the harrow might continue to function properly. The present includes means whereby, whenever desired, the harrow can be lifted bodily so as to withdraw the teeth from the accumulated trash and hold them in raised position until the teeth have bridged over the deposited piles whereupon the teeth will return automatically into engagement with the soil and the parts restored to their initial positions.

For the purpose of producing the foregoing result there is mounted on one of the bars or rods 2 a split sleeve made up of upper and lower sections 4 and 5 adjacent the ends of which are located laterally extended ears 6 and 7 respectively adapted to be drawn together by bolts 8 so as thus to be bound securely to the rod 2. A collar 9 is formed on sleeve 4 and constitutes an abutment for the hub 10 of a semi-circular segment 11 which is freely rotatable on the hub and is retained thereon preferably by the ears 7.

Figure 2:
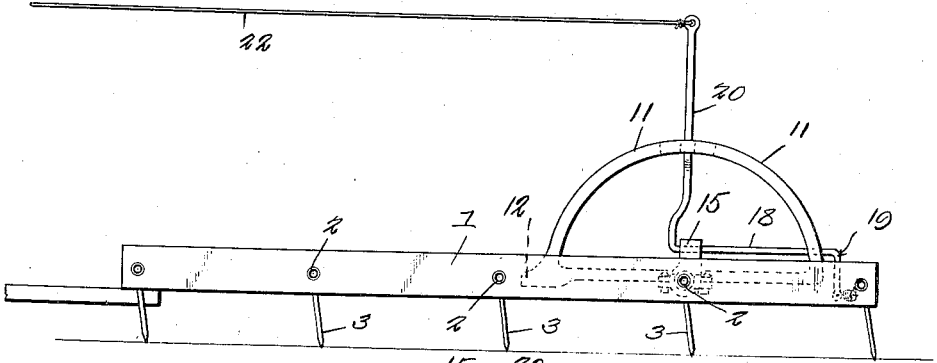
Figure 2 is a side elevation thereof.
Figure 6:
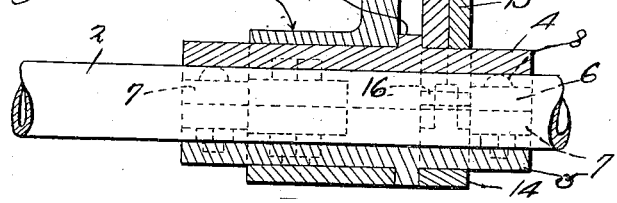
Figure 6 is a section on line 6—6, Figure 5.

The segment is normally positioned with its flat side or base lowermost and its arcuate portion uppermost, as shown for example in Figure 2 and a projecting nose or counterbalance 12 is located at that end of the base of the segment which normally is nearest the front of the harrow.

Ratchet teeth 13 are provided on one side of the arcuate portion of the segment 11 and are for the purpose hereinafter set forth.

Mounted on sleeve 4 between collar 9 and the ears 6 is a rotatable collar made up of a yoke 14 constituting the lower member and a clamping plate 15 constituting the upper member. These clamping plates straddle sleeve 4 and also receive between them the ends of yoke 14 to which they are held by bolts 16 which serve not only to hold the plate 15 to the yoke 14 but also serve to hold the clamping plate 15 normally pressed together as shown.

Matching grooves 17 are provided in the inner faces of the plates 15 and mounted for rotation in these grooves is a rod 18 having a crank arm 19 at one end and an operating lever 20 at its other end. A coiled spring 21 connects the crank arm 19 to a portion of the harrow frame, this spring being positioned at such an angle as to hold lever 20 normally swung backwardly to a substantially upright position, as shown in Figure 2, and laterally so as to engage between the teeth 13 on the upwardly extending arcuate portion of the segment 11.

An operating line 22 is attached to the upper end of lever 20 and is extended forwardly to a point where it can be conveniently grasped and actuated by the driver.

The harrow is operated in the usual way for the purpose of cultivating the soil. Should trash accumulate on the teeth 3 so as to interfere with the proper functioning of the device, the operator pulls on the line 22 so as to swing lever 20 forwardly away from its normal position and against the action of spring 21. During this forward movement the lever remains in engagement with one of the ratchet teeth 13 and, consequently, the segment 11 will be moved with the lever, its nose or counterbalance 12 swinging downwardly into contact with the surface of the soil. As soon as this contact is made, further forward movement of the harrow will cause the segment to function like a wheel and it will move into an inverted position, as shown in Figure 3, thereby lifting the harrow bodily so as to raise the teeth and allow the accumulated trash to slide from them. The harrow will remain in elevated position as long as the segment is located with its arcuate portion lowermost. During this rotation of the segment the ratchet teeth will slip out of engagement with the lever but the lever preferably will be held in a forwardly inclined position. Ultimately the weighted advancing end 12 of the segment will move upwardly and forwardly past the dead center so that the segment will continue to travel in a circular direction after the harrow has been lowered with its teeth in engagement with the soil and until the advancing ratchet teeth 13 come against and snaps past the lever. Said lever can then be released so that its spring will return it and the segment to normal position as in Figure 2 whereupon the parts are reset for again operating as described.

In Figures 7, 8 and 9, a slightly modified construction has been illustrated. In these figures the segment is mounted in the same manner as heretofore described and is of the same construction as the segment shown in the other figures. However, instead of providing members 14 and 15 and mounting the lever thereon as heretofore explained, there is supplied a bottom member or yoke 23 having an arm 24 extending from one end thereof while a cylindrical stud 25 is extended from the opposite end. Arm 24 has an ear 26 with an opening 27 which alines with stud 25. A plate 28 straddles the upper member 4 of the sleeve on rod 2 and has a stud 29 projecting in one direction therefrom and seated for rotation in the opening 27. A channeled arm 30 is extended in the opposite direction from plate 28 and straddles stud 25. This arm is held to the stud by a key 31 which extends through the sides of the channeled arm and loosely through an enlarged opening 32 in stud 25. The free end portion of the key can be anchored to arm 30 as shown at 33 so as to insure rotation of the key 31 with the arm should the plate 28 be swung about the axis of the studs 25 and 29 and relative to the yoke 23. Key 31 has a radial arm 34 which joins it to one end of a coiled spring 35, this spring being attached to a portion of the harrow frame so as to exert a constant pull upon the parts to which it is connected. A lever 36 is fixedly attached to plate 28 and the tautness of spring 35 serves to press plate 28 and lever 36 normally in the direction indicated by the arrow in Figure 9 so that lever 36 is thus normally pressed against the toothed side of the segment 11. However when the lever 36 is swung about the axes of rod 2 the spring 35 will be placed under increased tension and thus will act to restore the lever to its normal position following the actuation thereof by a line, as heretofore explained. It is to be understood that the tautness of the spring maintains the lever and segment normally pressed together. The lever is to be actuated in the same manner as heretofore described for the purpose of moving the segment out of normal position and bringing its weighted end or nose into contact with the soil.

What is claimed is:

1. The combination with a harrow or drag including a frame and toothed bars in the frame, of a segment mounted for free rotation on one of the bars, a combined nose and counterbalance projecting from one end of the segment at the base thereof, said segment being positioned normally with its base lowermost and with the nose extended in the direction of travel of the harrow, a lever mounted for movement upon the axis of the bar and laterally toward and from the segment, ratchet teeth on the segment for engagement with the lever, yielding means for holding the lever normally in engagement with the teeth of the segment and normally in an upwardly extended position to hold the segment and lever against free rotation, and means for actuating said lever to move the segment about the axis of the bar and bring the nose into contact with the soil.

2. The combination with the frame of a drag or harrow and a toothed bar mounted therein, of a segment mounted for rotation about the axis of the bar, said segment having a projecting counterbalance at one end of the base of the segment, teeth on the segment, a lever normally engaged by the teeth, yielding means for resisting the actuation of the lever and maintaining the lever normally in one position and in engagement with the toothed portion of the segment to maintain the segment with its base lowermost, means for actuating the lever away from its normal position to rotate the segment and bring the counterbalance in engagement with the soil, said segment constituting means for holding the harrow disengaged from the soil when the segment is positioned with its base uppermost.

3. The combination with a harrow or drag including a frame and a toothed bar therein, of a sleeve on the bar, a segment having a hub mounted for rotation on the sleeve, a lever mounted to swing about the axis of the sleeve and laterally toward and from the segment, yielding means for resisting the movement of the lever in either of said directions, means for swinging the lever out of normal position and against the action of said yielding means, and a tooth on the segment for engagement by the lever to move the segment with the lever about the axis of the sleeve and into contact with the ground under the harrow, said segment constituting means for rolling contact with the surface of the ground to support the harrow in raised position, and said tooth constituting means for wiping engagement with the lever to recouple the lever to the segment when said segment is moved toward its initial position, and a combined counterbalance and projecting nose at one end of the segment for moving said segment by gravity when disengaged from the soil to restore engagement of the tooth with the lever.

4. The combination with a harrow or drag including a frame and a toothed bar in the frame, of a bearing sleeve secured to the bar, a segment mounted for rotation on the sleeve, a combined counterbalance and nose at one end of the base of the segment, said base being normally lowermost with the nose or counterbalance extended in the direction of movement of the harrow, connected members mounted for rotation on the sleeve, a rod mounted for rotation relative to and supported by the members, said rod being extended across the axis of rotation of the segment, a lever at one end of the rod, an arm at the other end thereof, and a spring connected to the arm and positioned to exert a constant pull upon the arm to maintain the lever normally pressed laterally against the segment and in an upwardly extended position, means for shifting the lever about the axis of the sleeve and away from normal position, and means on the segment for engagement by the lever to rotate the segment therewith and bring the nose into contact with the soil thereunder.

HUGH RICHARDSON.